United States Patent
Sawai

(10) Patent No.: US 8,582,677 B2
(45) Date of Patent: Nov. 12, 2013

(54) COMMUNICATION APPARATUS, COMMUNICATION METHOD AND COMPUTER PROGRAM

(75) Inventor: Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 1192 days.

(21) Appl. No.: 12/479,996

(22) Filed: Jun. 8, 2009

(65) Prior Publication Data

US 2009/0310695 A1 Dec. 17, 2009

(30) Foreign Application Priority Data

Jun. 11, 2008 (JP) ................ P2008-153240

(51) Int. Cl.
*H04L 5/12* (2006.01)

(52) U.S. Cl.
USPC .......... 375/262; 375/341; 375/347; 704/242; 714/794; 714/795

(58) Field of Classification Search
None
See application file for complete search history.

(56) References Cited

U.S. PATENT DOCUMENTS

| | | | | |
|---|---|---|---|---|
| 6,587,526 B1* | 7/2003 | Li et al. | | 375/355 |
| 2002/0024994 A1* | 2/2002 | Piirainen et al. | | 375/231 |
| 2004/0264585 A1* | 12/2004 | Borran et al. | | 375/260 |
| 2005/0063087 A1* | 3/2005 | Ehrlich | | 360/77.08 |
| 2005/0117677 A1* | 6/2005 | Sampath | | 375/347 |
| 2005/0147025 A1* | 7/2005 | Auer | | 370/203 |
| 2006/0120487 A1* | 6/2006 | Nakao et al. | | 375/334 |
| 2007/0201351 A1* | 8/2007 | Egashira et al. | | 370/208 |
| 2008/0063040 A1* | 3/2008 | Akahori | | 375/232 |
| 2010/0232551 A1* | 9/2010 | Ojard | | 375/341 |
| 2011/0261905 A1* | 10/2011 | Shental et al. | | 375/316 |

FOREIGN PATENT DOCUMENTS

| | | |
|---|---|---|
| JP | 10-013262 | 1/1998 |
| JP | 10-173573 | 6/1998 |
| JP | 11-355373 | 12/1999 |
| JP | 2000-252841 | 9/2000 |
| JP | 2002-16577 | 1/2002 |
| JP | 2006-196989 | 7/2006 |
| JP | 2009-273128 | 11/2009 |

* cited by examiner

*Primary Examiner* — Adolf Dsouza
(74) *Attorney, Agent, or Firm* — Sherr & Jiang, PLLC

(57) ABSTRACT

There is provided a communication apparatus, including a transmission pattern generation unit that generates a transmission pattern according to a modulation method, a metric calculation unit that calculates an inter-signal distance between a received signal vector of received signals and an estimation vector, which is a product of channel information and the transmission pattern, a maximum likelihood pattern determination unit that determines a maximum likelihood signal pattern from the inter-signal distance calculated by the metric calculation unit, and an error estimation unit that estimates a phase error component and an amplitude error component contained in the received signal vector. The metric calculation unit calculates the inter-signal distance between the received signal vector and the estimation vector by using the phase error component and/or the amplitude error component estimated by the error estimation unit.

11 Claims, 6 Drawing Sheets

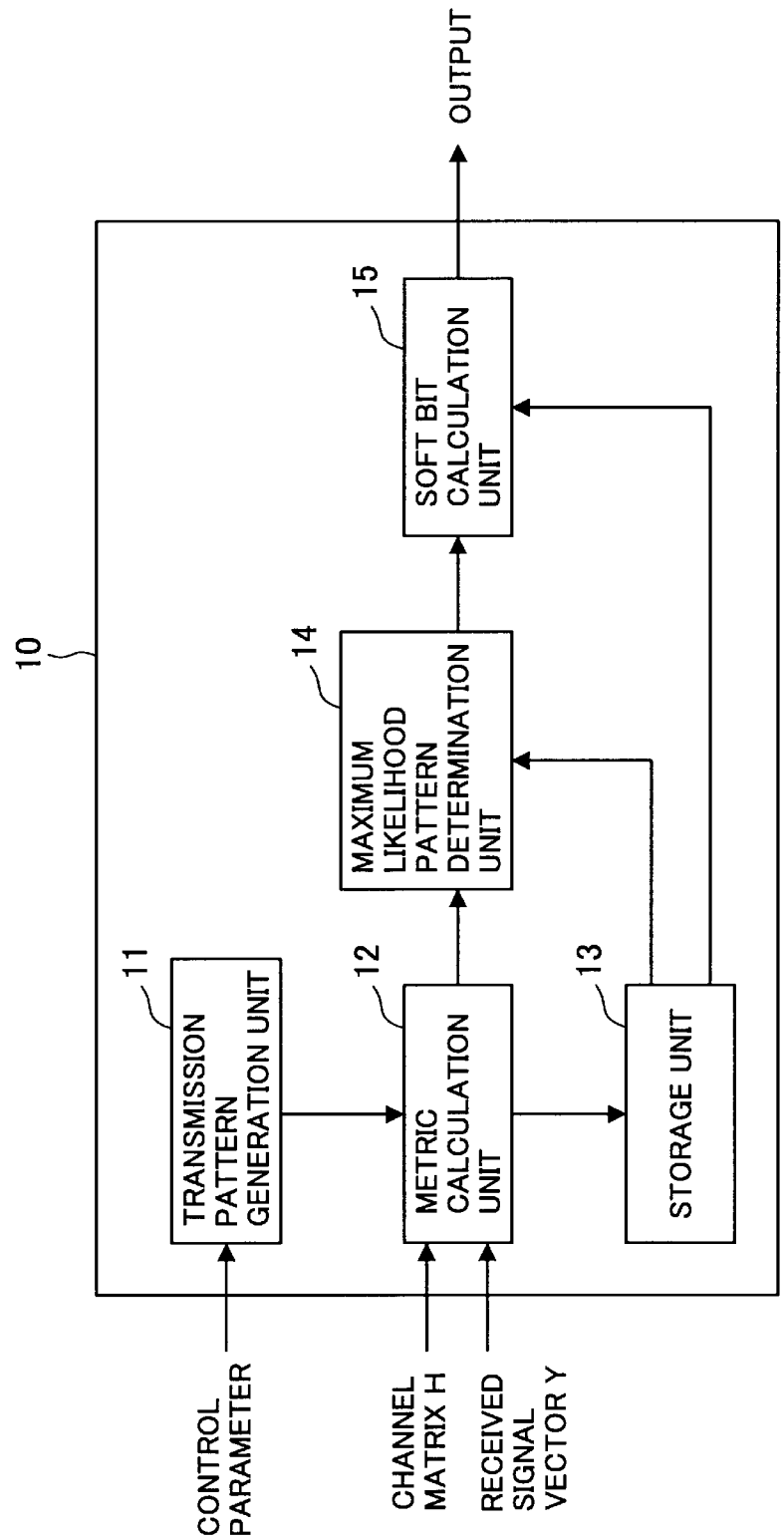

COMMUNICATION APPARATUS, COMMUNICATION METHOD AND COMPUTER PROGRAM

BACKGROUND OF THE INVENTION

1. Field of the Invention

The present invention relates to a communication apparatus, a communication method, and a computer program, and in particular, relates to a communication apparatus that performs communication by the MIMO (Multiple Input Multiple Output) method, a communication method, and a computer program.

2. Description of the Related Art

There is a radio communication system that increases a transmission capacity by providing a plurality of antennas on each of transmitting and receiving sides and by performing communication using space division multiplexing (MIMO method: Multiple Input Multiple Output) with the plurality of antennas.

Among MIMO receiving methods, the maximum likelihood detection (MLD) that shows the best characteristics has proved extremely resistant to various error components (such as phase noise, amplitude distortion, frequency offset, and clock shifts) due to imperfection of RF (Radio Frequency).

FIG. 5 is an explanatory view showing PER (Packet Error Rate) characteristics of the MMSE (Minimum Mean Squared Error) method and the MLD method as a graph. The modulation method in FIG. 5 is an MCS (Modulation and Coding Scheme) 12 of 64 QAM (Quadrature Amplitude Modulation)×2. As shown in FIG. 5, characteristics of MLD are worse than those of MMSE only if a frequency offset is applied even after a correction using pilot information inserted in an 11n format of WLAN (Wireless LAN) is made.

Investigation of resistance to phase errors based on simulation evaluation revealed that it is necessary to control a phase error to about 1° to 2° when 64 QAM×2 is used to maintain original characteristics of MLD, which shows that extremely high accuracy is demanded from 64 QAM. When only a phase error is considered, even if 3% RMS (30 [dB]) of EVM (Error Vector Magnitude) of RF is achieved, potentially about 3° of a nonlinear phase error will typically be present. In WLAN, Control Channel is not constantly transmitted like cellular communication and therefore, it is very difficult to prevent characteristic degradation due to reception of MIMO-MLD of 64 QAM.

SUMMARY OF THE INVENTION

Various characteristic improvement methods for RF error corrections have been proposed, but many of which relate to 16 QAM concerning usefulness for the MLD and almost all concern cellular communication. From the standpoint of system design, on the other hand, latency provisions that a system needs to permit are present. For cellular communication, latency of several milliseconds is permissible so that the MLD can be executed while removing nonlinear noise and distortion by passing through the RF by repeatedly using strong error correction decoding such as a turbo decoder and LDPC (Low Density Parity Check).

However, using error correction decoding repeatedly is not realistic in WLAN in which very stringent latency provisions (16 microseconds) of SIFS (Short Inter Frame Space) are present. Moreover, K=7 Viterbi is the base of error correction decoding in WLAN and therefore, removal of nonlinear noise and distortion may not be expected even if error correction decoding is repeatedly used.

Thus, the present invention has been made in view of the above issues and there is a need for a novel and improved communication apparatus capable of minimizing characteristic degradation when a signal modulated by a modulation method by which a phase error component or amplitude error component contained in a received signal greatly affects demodulation such as 64 QAM MIMO-MLD by detecting a phase error or amplitude error from signals received by a plurality of antenna elements and searching for a combination of maximum likelihood signal, a communication method, and a computer program.

According to an embodiment of the present invention, there is provided a communication apparatus, including: a transmission pattern generation unit that generates a transmission pattern according to a modulation method; a metric calculation unit that calculates an inter-signal distance between a received signal vector of signals received by a plurality of antennas and an estimation vector, which is a product of channel information and the transmission pattern; a maximum likelihood pattern determination unit that determines a maximum likelihood signal pattern from the inter-signal distance calculated by the metric calculation unit; and an error estimation unit that estimates a phase error component and an amplitude error component contained in the received signal vector, wherein the metric calculation unit calculates the inter-signal distance between the received signal vector and the estimation vector by reflecting the phase error component and/or the amplitude error component estimated by the error estimation unit.

According to the above configuration, the transmission pattern generation unit generates a transmission pattern according to a modulation method, and the metric calculation unit calculates an inter-signal distance between a received signal vector of signals received by a plurality of antennas and an estimation vector, which is a product of channel information and the transmission pattern. The maximum likelihood pattern determination unit determines a maximum likelihood pattern from the inter-signal distance calculated by the metric calculation unit, and the error estimation unit estimates a phase error component and an amplitude error component contained in the received signal vector. Then, the metric calculation unit calculates the inter-signal distance between the received signal vector and the estimation vector by reflecting the phase error component and/or the amplitude error component estimated by the error estimation unit. As a result, characteristic degradation when a signal modulated by a modulation method like 64 QAM MIMO-MLD by which a phase error component or amplitude error component contained in a received signal greatly affects demodulation is decoded can be minimized by estimating a phase error and amplitude error from signals received by a plurality of antenna elements and searching for a combination of maximum likelihood signals.

The error estimation unit may estimate only the phase error component when the modulation method is phase modulation. The error estimation unit may estimate only the amplitude error component when the modulation method is amplitude modulation.

The error estimation unit may estimate the phase error component and the amplitude error component for each channel or sub-channel.

The error estimation unit may estimate the phase error component and the amplitude error component by weighting or averaging a plurality of channels or sub-channels.

The metric calculation unit may determine an upper limit, a lower limit, and a step size of the phase error component and the amplitude error component in accordance with resistance of the modulation method to calculate the inter-signal distance between the received signal vector and the estimation vector.

The metric calculation unit may apply an optimum solution search algorithm to reduce a number of searches for calculating the inter-signal distance. In this case, the metric calculation unit may make a search without considering a phase error and an amplitude error and may calculate the inter-signal distance by considering the phase error and the amplitude error only for a group of the estimation vectors corresponding to transmission signal patterns selected from combinations of semi-maximum likelihood signals whose inter-signal distance is short.

The communication apparatus may further include a maximum likelihood information generation unit that generates maximum likelihood information in units of bits or symbols using the maximum likelihood pattern determined by the maximum likelihood pattern determination unit and the phase error component and the amplitude error component.

The maximum likelihood pattern determination unit may determine, when determining the maximum likelihood pattern using an operation amount reduced MLD algorithm, the maximum likelihood signal pattern by taking the phase error component and the amplitude error component into consideration.

The maximum likelihood pattern determination unit may determine the maximum likelihood signal pattern by considering that the channel information also contains the phase error component and the amplitude error component.

According to another embodiment of the present invention, there is provided a communication method, including the steps of: generating a transmission pattern according to a modulation method; calculating an inter-signal distance between a received signal vector of signals received by a plurality of antennas and an estimation vector, which is a product of channel information and the transmission pattern; determining a maximum likelihood signal pattern from the inter-signal distance calculated by a metric calculation unit; and estimating a phase error component and an amplitude error component contained in the received signal vector, wherein the metric calculation step calculates the inter-signal distance between the received signal vector and the estimation vector by reflecting the phase error component and/or the amplitude error component estimated by the error estimation step.

According to another embodiment of the present invention, there is provided a computer program causing a computer to perform the steps of: generating a transmission pattern according to a modulation method; calculating an inter-signal distance between a received signal vector of signals received by a plurality of antennas and an estimation vector, which is a product of channel information and the transmission pattern; determining a maximum likelihood signal pattern from the inter-signal distance calculated by the metric calculation step; and estimating a phase error component and an amplitude error component contained in the received signal vector, wherein the metric calculation step calculates the inter-signal distance between the received signal vector and the estimation vector by reflecting the phase error component and/or the amplitude error component estimated by the error estimation step.

According to the embodiments of the present invention described above, in consideration of a phase error component and amplitude error component being contained in signals received by a plurality of antenna elements, there can be provided a novel and improved communication apparatus capable of minimizing characteristic degradation when a signal modulated by a modulation method by which a phase error component or amplitude error component contained in a received signal greatly affects demodulation such as 64 QAM MIMO-MLD by estimating a phase error component or amplitude error component from received signals and searching for a combination of maximum likelihood signal, a communication method, and a computer program.

BRIEF DESCRIPTION OF THE DRAWINGS

FIG. 6 is an explanatory view illustrating a general configuration of a decoder (MLD decoder) by a MIMO-MLD method in related art.

DETAILED DESCRIPTION OF THE PREFERRED EMBODIMENTS

Figure 1:
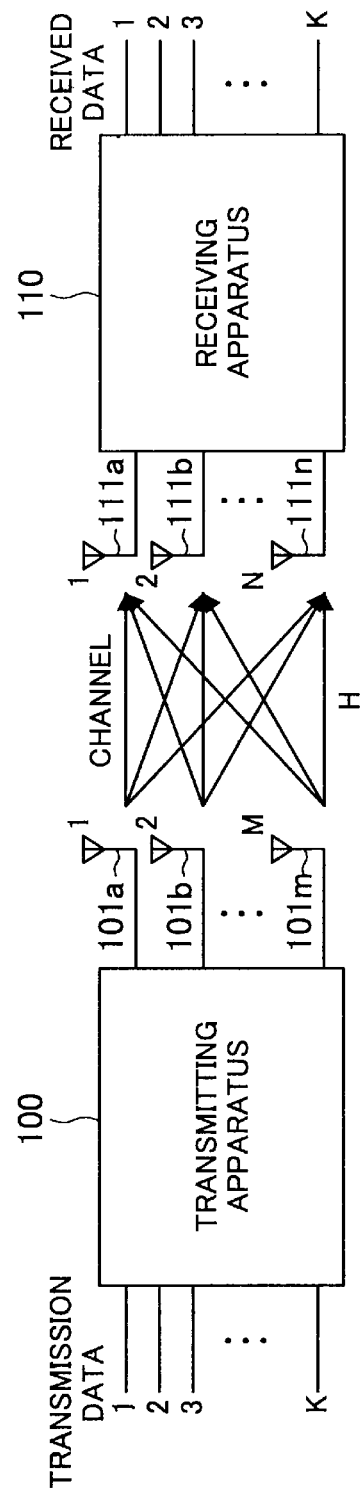
FIG. 1 is an explanatory view conceptually showing a radio communication system by an MIMO method.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First, an overview of a radio communication system by an MIMO method will be provided. FIG. 1 is an explanatory view conceptually showing a radio communication system by an MIMO method. In the radio communication system shown in FIG. 1, a transmitting apparatus 100 has M antennas 101$a$, 101$b$, . . . , 101$m$, and the receiving apparatus 110 has N antennas 111$a$, 111$b$, . . . , 111$n$.

The transmitting apparatus 100 transmits k pieces of transmission data by space/time encoding the transmission data for multiplexing and allocating multiplexed transmission data to the M antennas 101$a$, 101$b$, . . . , 101$m$, transmitting to a channel and the receiving apparatus 110 obtained received data space/time decoding a received signal received by the N antennas 111$a$, 111$b$, . . . , 111$n$.

Therefore, according to the MIMO method, transmission data is allocated to a plurality of antennas in the transmitting apparatus 100 for transmission and received data is obtained by the receiving apparatus 110 by signal processing from a signal received by a plurality of antennas and therefore, the MIMO method is a communication method utilizing channel characteristics. Channel information between transmitting and receiving antennas is represented by an M-row×N-column channel matrix H.

Figure 2:
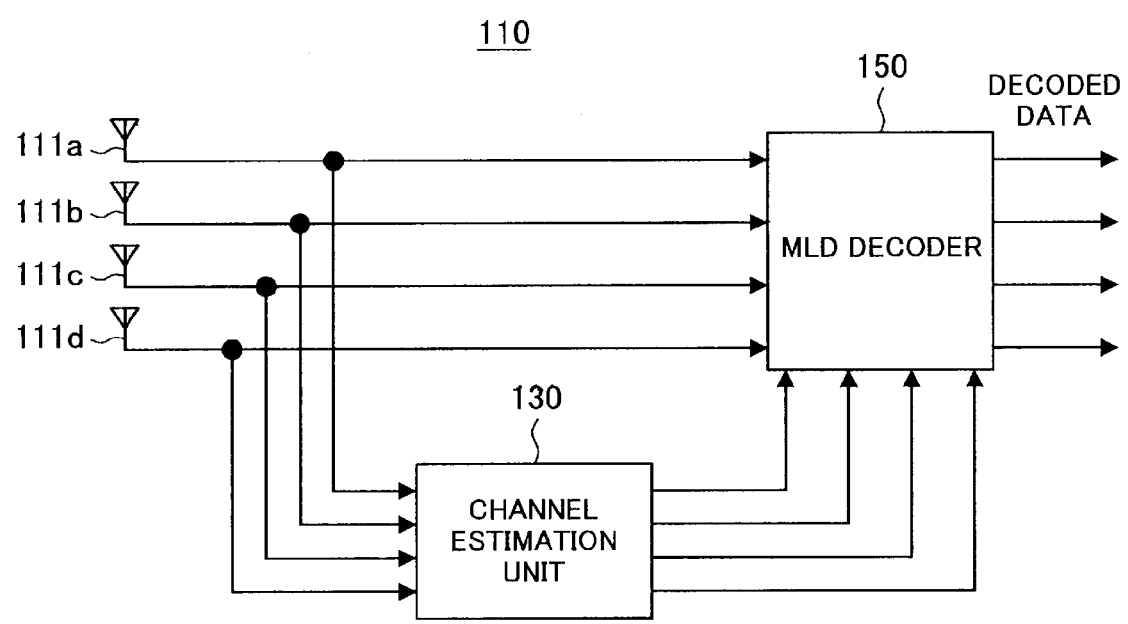
FIG. 2 is an explanatory view conceptually showing an internal configuration of a receiving apparatus 110 shown in FIG. 1.

Next, the internal configuration of the receiving apparatus 110 shown in FIG. 1 will be described. FIG. 2 is an explanatory view conceptually showing the internal configuration of the receiving apparatus 110 shown in FIG. 1. The internal configuration of the receiving apparatus 110 will be described below using FIG. 2.

As shown in FIG. 2, the receiving apparatus 110 includes a channel estimation unit 130 and an MLD decoder 150. While FIG. 2 shows a case in which four antennas (the antennas 111a, 111b, 111c, and 111d) are used for reception for convenience's sake, but the present invention is naturally not limited to such an example.

The channel estimation unit 130 estimates channel information H between the transmitting apparatus 100 and the receiving apparatus 110 from a received signal vector Y obtained from received signals of the antennas 111a, 111b, 111c, and 111d. The channel information H can be estimated, for example, using pilot symbols attached to received signals received by the antennas 111a, 111b, 111c, and 111d. The channel information H estimated by the channel estimation unit 130 is sent to the MLD decoder 150.

The MLD decoder 150 separates received signals by the MDL method using the received signal vector Y obtained from received signals of the antennas 111a, 111b, 111c, and 111d and the channel information H estimated by the channel estimation unit 130. Received signals separated by the MLD decoder 150 are output from the MLD decoder 150 as decoded data.

In the foregoing, the internal configuration of the receiving apparatus 110 has been described using FIG. 2. Next, the general configuration of a decoder by the MIMO-MLD method in related art will be described before preferred embodiments of the present invention being described in detail. FIG. 6 is an explanatory view illustrating the general configuration of a decoder (MLD decoder) by the MIMO-MLD method in related art.

An MLD decoder 10 shown in FIG. 6 is, for example, embedded in the receiving apparatus 110 and used for separating and decoding received signals received by a plurality of antennas. As shown in FIG. 6, the MLD decoder 10 in related art includes a transmission pattern generation unit 11, a metric calculation unit 12, a storage unit 13, a maximum likelihood pattern determination unit 14, and a soft bit calculation unit 15.

The transmission pattern generation unit 11 generates a transmission pattern S based on an input control parameter after the control parameter corresponding to the modulation method or like being input from outside. The transmission pattern S generated by the transmission pattern generation unit 11 is output to the metric calculation unit 12.

The metric calculation unit 12 calculates, after the channel matrix H, the received signal vector Y, and the transmission pattern S generated by the transmission pattern generation unit 11 being input from outside, an inter-signal distance (hereinafter, the inter-signal distance will also be called a "metric") between a product of the channel matrix H and the transmission pattern S and the received signal vector Y. The metric calculated by the metric calculation unit 12 is sent to the storage unit 13 to be temporarily stored there and also used for a search of a combination of maximum likelihood signals in the maximum likelihood pattern determination unit 14.

The storage unit 13 temporarily stores the metric between the product of the channel matrix H and the transmission pattern S and the received signal vector Y. The value of metric temporarily stored in the storage unit 13 is used for the search of a combination of maximum likelihood signals in the maximum likelihood pattern determination unit 14.

The maximum likelihood pattern determination unit 14 searches for a combination of maximum likelihood signals using metrics calculated by the metric calculation unit 12 and temporarily stored in the storage unit 13 to determine the combination of maximum likelihood signals. The combination of maximum likelihood signals determined by the maximum likelihood pattern determination unit 14 is sent to the soft bit calculation unit 15.

The soft bit calculation unit 15 calculates and generates a soft bit using metrics calculated by the metric calculation unit 12 and temporarily stored in the storage unit 13 and the combination of maximum likelihood signals determined by the maximum likelihood pattern determination unit 14.

As shown in FIG. 6, the MLD decoder 10 in related art determines a combination of maximum likelihood signals using a control parameter such as the modulation method input from outside, the channel matrix H, and the received signal vector Y and calculates a soft bit to output the generated soft bit.

However, the value of a metric calculated by the metric calculation unit 12 changes even for the same point depending on whether a phase error or amplitude error is present in the received signal vector Y and no error is present.

Table 1 and Table 2 show examples of metric ranking and the maximum likelihood transmission pattern. Table 1 is a table showing an example of metric ranking and the maximum likelihood transmission pattern when neither phase error nor amplitude error is present in the received signal vector Y, and Table 2 is a table showing an example of metric ranking and the maximum likelihood transmission pattern when a phase error or amplitude error is present in the received signal vector Y. Here, Table 2 shows metric ranking and the maximum likelihood transmission pattern when a phase error of 1.5° is present. In Table 1 and Table 2, "real part" shows values of the real part and "imag part" shows values of the imaginary part.

TABLE 1

(when neither phase error nor amplitude error is present in the received signal vector Y)

| Ranking | Metric number | Metric value | s0 real part | s0 imag part | s1 real part | s1 imag part |
|---|---|---|---|---|---|---|
| 1 | 3387 | 1.30E−03 | 5.46E−01 | 1.09E−01 | 7.64E−01 | −1.09E−01 |
| 2 | 3002 | 2.05E−03 | 3.27E−01 | 5.46E−01 | 7.64E−01 | −3.27E−01 |
| 3 | 4082 | 4.16E−03 | 7.64E−01 | 7.64E−01 | 5.46E−01 | −3.27E−01 |
| 4 | 3955 | 4.29E−03 | 7.64E−01 | 3.27E−01 | 5.46E−01 | −1.09E−01 |
| 5 | 3772 | 4.47E−03 | 7.64E−01 | −3.27E−01 | 7.64E−01 | 1.09E−01 |
| 6 | 3709 | 6.05E−03 | 7.64E−01 | −5.46E−01 | 7.64E−01 | 3.27E−01 |
| 7 | 3260 | 6.11E−03 | 5.46E−01 | −3.27E−01 | 7.64E−01 | 1.09E−01 |
| 8 | 2875 | 8.00E−03 | 3.27E−01 | 1.09E−01 | 7.64E−01 | −1.09E−01 |
| 9 | 3645 | 8.15E−03 | 7.64E−01 | −7.64E−01 | 7.64E−01 | 3.27E−01 |
| 10 | 3836 | 8.20E−03 | 7.64E−01 | −1.09E−01 | 7.64E−01 | 1.09E−01 |
| 11 | 4018 | 9.76E−03 | 7.64E−01 | 5.46E−01 | 5.46E−01 | −3.27E−01 |
| 12 | 3324 | 9.84E−03 | 5.46E−01 | −1.09E−01 | 7.64E−01 | 1.09E−01 |

TABLE 1-continued (when neither phase error nor amplitude error is
present in the received signal vector Y)

| Ranking | Metric number | Metric value | s0 real part | s0 imag part | s1 real part | s1 imag part |
|---|---|---|---|---|---|---|
| 13 | 3570 | 1.01E−02 | 5.46E−01 | 7.64E−01 | 5.46E−01 | −3.27E−01 |
| 14 | 3451 | 1.08E−02 | 5.46E−01 | 3.27E−01 | 7.64E−01 | −1.09E−01 |

TABLE 2

(when a phase error or amplitude error is present
in the received signal vector Y)

| Ranking | Metric number | Metric value | s0 real part | s0 imag part | s1 real part | s1 imag part |
|---|---|---|---|---|---|---|
| 1 | 3709 | 2.30E−03 | 7.64E−01 | −5.46E−01 | 7.64E−01 | 3.27E−01 |
| 2 | 3324 | 2.58E−03 | 5.46E−01 | −1.09E−01 | 7.64E−01 | 1.09E−01 |
| 3 | 3955 | 4.58E−03 | 7.64E−01 | 3.27E−01 | 5.46E−01 | −1.09E−01 |
| 4 | 3451 | 4.70E−03 | 5.46E−01 | 3.27E−01 | 7.64E−01 | −1.09E−01 |
| 5 | 3002 | 4.73E−03 | 3.27E−01 | 5.46E−01 | 7.64E−01 | −3.27E−01 |
| 6 | 3836 | 5.11E−03 | 7.64E−01 | −1.09E−01 | 7.64E−01 | 1.09E−01 |
| 7 | 4082 | 6.00E−03 | 7.64E−01 | 7.64E−01 | 5.46E−01 | −3.27E−01 |
| 8 | 4019 | 6.50E−03 | 7.64E−01 | 5.46E−01 | 5.46E−01 | −1.09E−01 |
| 9 | 3570 | 6.54E−03 | 5.46E−01 | 7.64E−01 | 5.46E−01 | −3.27E−01 |
| 10 | 2939 | 7.04E−03 | 3.27E−01 | 3.27E−01 | 7.64E−01 | −1.09E−01 |
| 11 | 3387 | 7.65E−03 | 5.46E−01 | 1.09E−01 | 7.64E−01 | −1.09E−01 |
| 12 | 3066 | 8.46E−03 | 3.27E−01 | 7.64E−01 | 7.64E−01 | −3.27E−01 |
| 13 | 2875 | 9.99E−03 | 3.27E−01 | 1.09E−01 | 7.64E−01 | −1.09E−01 |
| 14 | 2490 | 1.20E−02 | 1.09E−01 | 5.46E−01 | 7.64E−01 | −3.27E−01 |

Reference to Table 1 showing a table when neither phase error nor amplitude error is present in the received signal vector Y shows that Metric Number 3387 has the smallest Metric Value. However, even if the Metric Value is the smallest when neither phase error nor amplitude error is present in the received signal vector Y, if a phase error or amplitude error is present in the received signal vector Y, the Metric Value is not necessarily the smallest. Referring to the case of Table 1 and Table 2, the Metric Value of the Metric Number 3387 falls to the 11th by counting from the smallest Metric Value if Table 2 showing a table when a phase error or amplitude error is present in the received signal vector Y is referenced.

On the other hand, even if a Metric Value is not the smallest when neither phase error nor amplitude error is present in the received signal vector Y, the Metric Value may not necessarily be no smallest Metric Value if a phase error or amplitude error is present in the received signal vector Y. Referring to the case of Table 1 and Table 2, the metric whose Metric Number is 3709 shown in Table 1 has the sixth smallest Metric Value by counting from the smallest Metric Value, but reference to Table 2 shows that the Metric Value of the Metric Number 3709 is the smallest in Table 2.

The above example shows that the maximum likelihood point undergoes a sea change only by a phase error of several degrees being contained in the received signal vector Y. Reliability of soft output also significantly declines if the maximum likelihood point is mistaken so that it is necessary to search for a maximum likelihood point that takes an influence on metrics for error components contained in known vectors into consideration.

Thus, in an embodiment of the present invention, it is assumed that a phase error component and amplitude error component are constantly present between the channel matrix H and data symbols within a fixed range due to an influence of phase noise or a residual frequency offset. When, based on this assumption, a phase error component and amplitude error component are contained, a semi-maximum likelihood value is searched for assuming that even if the smallest metric value changes, the maximum likelihood value is present typically in the vicinity thereof. Then, the semi-maximum likelihood value obtained at this point and several to ten-odd metric values counted from the semi-maximum likelihood value are extracted and stored. Then, metrics are recalculated by assuming that an amplitude error component and phase error component are contained in the received signal vector Y for symbols having the extracted metric values. By recalculating metrics in this manner, characteristic degradation can be minimized even in an environment in which nonlinear noise or distortion due to an RF error is present.

The configuration of an MLD decoder used in a communication apparatus according to an embodiment of the present invention will be described below.

Figure 3:
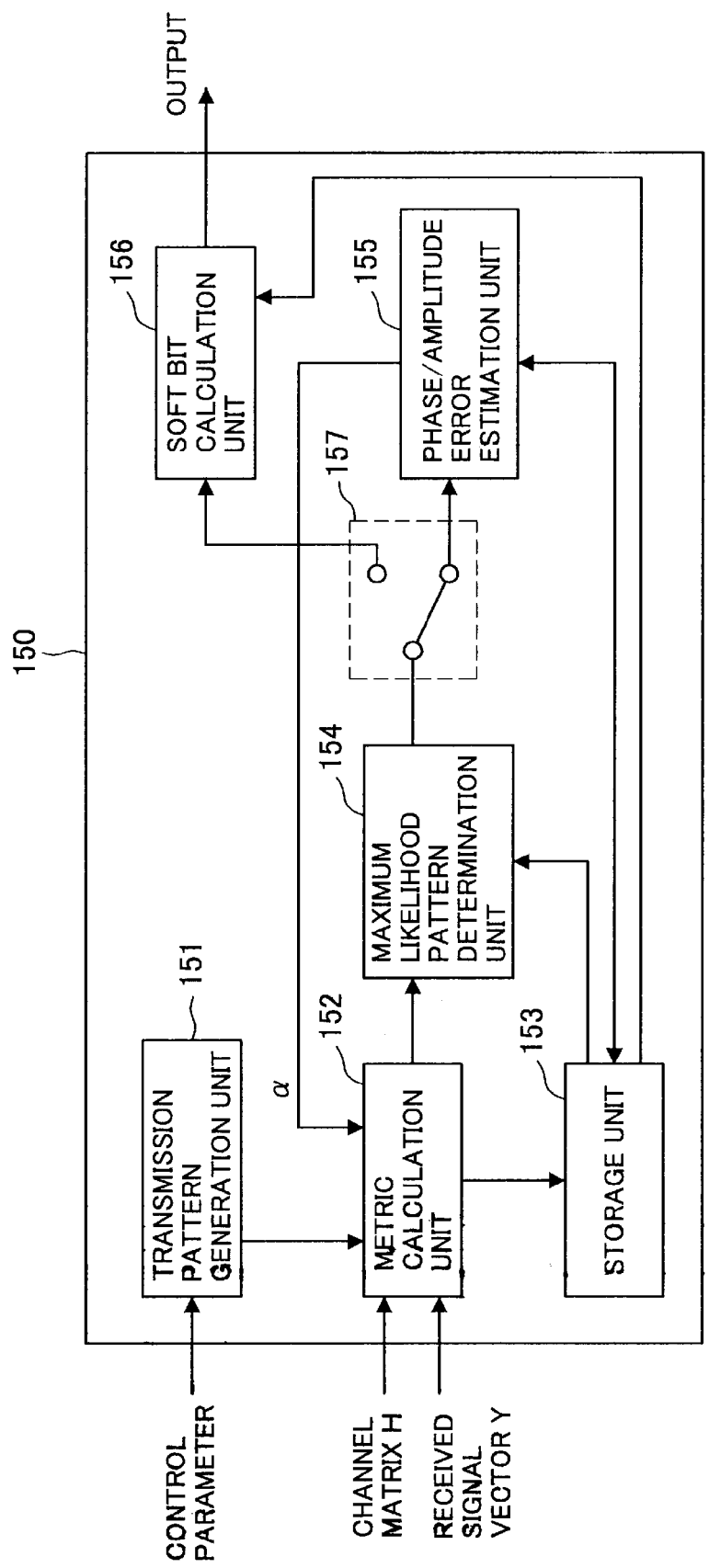
FIG. 3 is an explanatory view illustrating the configuration of the MLD decoder 150 used in the communication apparatus according to the embodiment of the present invention.

FIG. 3 is an explanatory view illustrating the configuration of the MLD decoder 150 used in the communication apparatus according to an embodiment of the present invention. The configuration of the MLD decoder 150 used in the communication apparatus according to the embodiment of the present invention will be described below using FIG. 3.

The MLD decoder 150 is, for example, embedded in the receiving apparatus 110 and is used for separating and decoding received signals received by a plurality of antennas. As shown in FIG. 3, the MLD decoder 150 according to the embodiment of the present invention includes a transmission pattern generation unit 151, a metric calculation unit 152, a storage unit 153, a maximum likelihood pattern determination unit 154, a phase/amplitude error estimation unit 155, a soft bit calculation unit 156, and a switch 157.

The transmission pattern generation unit 151 generates, like the above transmission pattern generation unit 11, a transmission pattern S based on an input control parameter after the control parameter corresponding to the modulation method or like being input from outside. The transmission pattern generation unit 151 outputs the generated transmission pattern S to the metric calculation unit 152.

The metric calculation unit 152 calculates, after the channel matrix H, the received signal vector Y, and the transmission pattern S generated by the transmission pattern generation unit 151 being input from outside, a metric between a product of the channel matrix H and the transmission pattern S and the received signal vector Y. Then, in the MLD decoder 150, in contrast to the metric calculation unit 12, a metric is calculated using a phase error and amplitude error estimated by the phase/amplitude error estimation unit 155 described later. The metric calculated by the metric calculation unit 152 is sent to the storage unit 153 to be temporarily stored there and also used for a search of a combination of maximum likelihood signals in the maximum likelihood pattern determination unit 154.

The storage unit 153 temporarily stores the metric calculated by the metric calculation unit 152 between the product of the channel matrix H and the transmission pattern S and the received signal vector Y. The value of metric temporarily stored in the storage unit 153 is used for the search of a combination of maximum likelihood signals in the maximum likelihood pattern determination unit 154.

The maximum likelihood pattern determination unit 154 searches for a combination of maximum likelihood signals using metrics calculated by the metric calculation unit 152 and temporarily stored in the storage unit 153 to determine the combination of maximum likelihood signals. The combination of maximum likelihood signals determined by the maximum likelihood pattern determination unit 154 is sent to the phase/amplitude error estimation unit 155 or the soft bit calculation unit 156.

The phase/amplitude error estimation unit 155 estimates a phase error and amplitude error used for calculation of a metric by the metric calculation unit 152. A phase error or amplitude error estimated by the phase/amplitude error estimation unit 155 is sent to the metric calculation unit 152 to be used for calculation of a metric by the metric calculation unit 152. Various methods can be used for estimating a phase error and amplitude error and a method of estimating such an error by determining the upper limit, lower limit of a phase error and amplitude error, and the step size of search will be described here.

A metric calculation method used by the MLD method in related art is shown in Formula (1). In Formula (1), m is the total number of transmission patterns and if patterns are not reduced, m is given by m=(modulation multi-valued number)$^a$ where a is the number of transmission antennas.

$$\operatorname*{metric}_{0<k<m} = \|Y - H \cdot S_k\| \quad \ldots \ldots \ldots$$

A metric calculation formula used by the MLD decoder 150 according to the present embodiment is shown in Formula (2) below.

$$\operatorname*{metric}_{0<i<n, 0<k<m} = \|Y \cdot \alpha_i - H \cdot S_k\|$$

$$\alpha_i = A_i e^{j\theta_i} \quad \ldots \ldots \ldots$$

Here, if the search number is not reduced, n is uniquely determined by upper limits ($\alpha''_{max}$, $\alpha'_{max}$) of a phase error and amplitude error, lower limits ($\alpha''_{min}$, $\alpha'_{min}$) of a phase error and amplitude error, and step sizes of search ($\Delta\alpha''$, $\Delta\alpha'$). $\alpha'$ indicates an amplitude error and $\alpha''$ indicates a phase error. The upper limit, lower limit, and step size of search for a phase error component and amplitude error component may be determined in accordance with modulation signal resistance. For example, while resistance to a phase error may allow, based on simulation evaluation, up to 6° for 16 QAM×2 to maintain original characteristics of MLD, it is necessary, as described above, to control a phase error to about 1° to 2° when 64 QAM×2 is used. Therefore, the upper limit, lower limit, and step size of search for a phase error component and amplitude error component may be changed for 16 QAM and 64 QAM. Further, when the upper limit, lower limit, and step size of search for a phase error component and amplitude error component are determined, any optimum solution search algorithm to reduce the number of searches may be applied to reduce the operation amount instead of calculating metric for all cases.

When the phase/amplitude error estimation unit 155 estimates a phase error component and amplitude error component, the phase/amplitude error estimation unit 155 may estimate an error component for each channel (for each sub-channel for frequency multiplexing), weighting of a plurality of channels (for each sub-channel for frequency multiplexing), or averaging of a plurality of channels. When weighting of a plurality of channels is used, the plurality of channels may be weighted by power after FFT being performed.

The maximum likelihood pattern determination unit 154 estimates the maximum likelihood pattern and the amplitude error component/phase error component using Formula (3) below by searching for the minimum value again from metrics containing a phase error and amplitude error estimated by the phase/amplitude error estimation unit 155.

$$\operatorname*{argmin}_{0<i<n, 0<k<m} \|Y \cdot \alpha_i - H \cdot S_k\|^2 \quad \ldots \ldots \ldots$$

The soft bit calculation unit 156 is an example of a maximum likelihood information generation unit of the present invention and generates maximum likelihood information in units of bits or symbols. The soft bit calculation unit 156 according to the present embodiment calculates soft bits using metrics calculated by the metric calculation unit 152 and temporarily stored in the storage unit 153, a combination of maximum likelihood signals determined by the maximum likelihood pattern determination unit 154, and an amplitude error component/phase error component estimated by the phase/amplitude error estimation unit 155 and outputs a calculation result.

In the MLD decoder 150 according to the present embodiment, as described above, a maximum likelihood point is searched for in consideration of a phase error and amplitude error by assuming the presence of such a phase error and amplitude error. By searching for a maximum likelihood point in consideration of a phase error and amplitude error, characteristic degradation can be minimized even in an environment in which nonlinear noise or distortion due to an RF error is present.

While an amplitude error component and phase error component are estimated by the phase/amplitude error estimation unit 155, and a maximum likelihood point is searched for by taking the estimated amplitude error component and phase error component into consideration in the present embodiment, the present invention is not limited to such an example. If, for example, the target modulation method is an amplitude modulation method or a receiving environment in which a phase error component does not affect an estimation result is provided, only an amplitude error component may be estimated. If the target modulation method is a phase modulation method or a receiving environment in which an amplitude error component does not affect an estimation result is provided, only a phase error component may be estimated.

The phase/amplitude error estimation unit 155 may estimate a phase error component and amplitude error component for each channel or each sub-channel. The phase/amplitude error estimation unit 155 may also estimate a phase error component and amplitude error component by weighting or averaging a plurality of channels or sub-channels.

In the foregoing, the configuration of the MLD decoder 150 used in a communication apparatus according to an embodiment of the present invention has been described. The function of each of the above components may be realized by a CPU (not shown) and the like using software or dedicated hardware. Next, an operation of the MLD decoder 150 used in a communication apparatus according to an embodiment of the present invention will be described.

Figure 4:
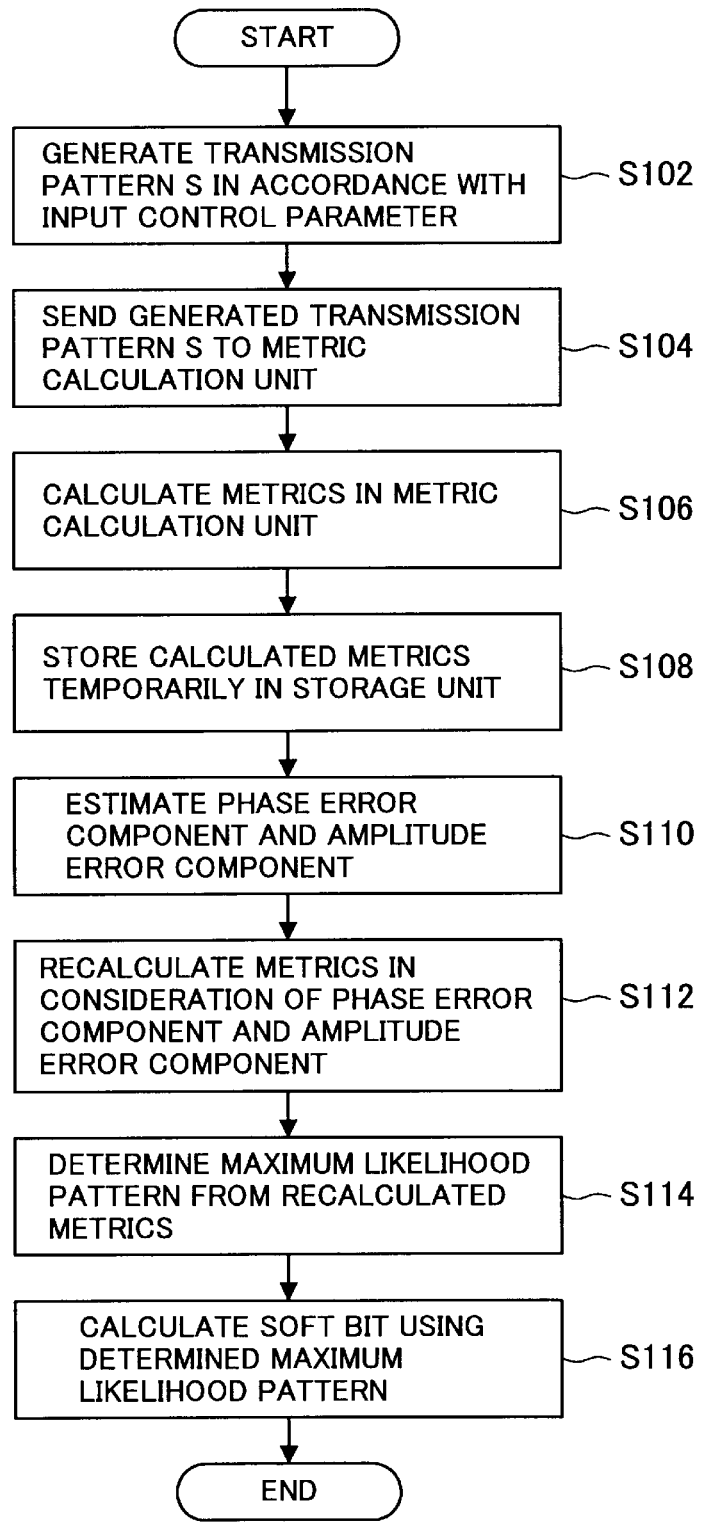
FIG. 4 is a flow chart illustrating an operation of an MLD decoder 150 used in a communication apparatus according to an embodiment of the present invention.
Figure 5:
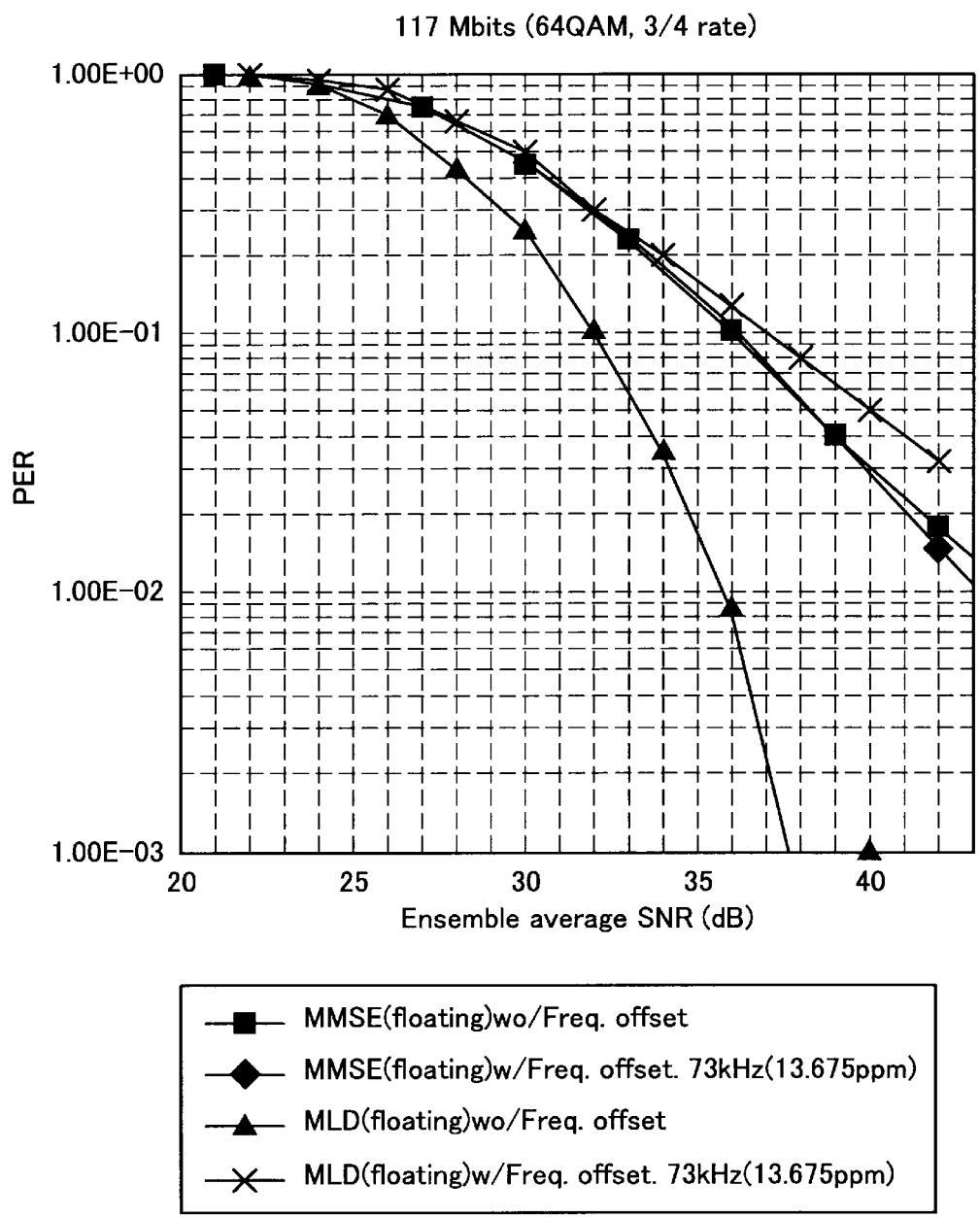
FIG. 5 is an explanatory view showing an example of PER characteristics by am MMSE method and an MLD method as a graph.

FIG. 4 is a flow chart illustrating an operation of the MLD decoder 150 used in a communication apparatus according to an embodiment of the present invention. An operation of the MLD decoder 150 used in a communication apparatus according to the embodiment of the present invention will be described using FIG. 4.

To search for a maximum likelihood point by the MLD decoder 150, control parameters corresponding to the modulation method or the like are first input into the transmission pattern generation unit 151 and a transmission pattern S is formed in accordance with the input control parameters (step S102). After the transmission pattern S in accordance with the input control parameters being formed by the transmission pattern generation unit 151 at step S102, the transmission pattern generation unit 151 sends the generated transmission pattern S to the metric calculation unit 152 (step S104).

The transmission pattern S generated by the transmission pattern generation unit 151 and the channel matrix H and the received signal vector Y input from outside are input into the metric calculation unit 152. Information about a phase error component and amplitude error component α estimated by the phase/amplitude error estimation unit 155 is also input into the metric calculation unit 152.

After the transmission pattern S generated by the transmission pattern generation unit 151 and the channel matrix H and the received signal vector Y input from outside being input, the metric calculation unit 152 calculates a metric based on the above information (step S106). The metric calculated at step S106 is calculated by assuming that there is neither phase error component nor amplitude error component, but as shown in Table 1 and Table 2, ranking changes depending on the presence of a phase error component or amplitude error component.

Therefore, a predetermined number of metrics in ascending order of value from the smallest metric (semi-maximum likelihood value) (for example, first several to ten-odd metrics in ascending order of metric value from the semi-maximum likelihood value) are temporarily stored in the storage unit 153. Then, the metric is recalculated for each symbol corresponding to metrics temporarily stored in the storage unit 153 by the metric calculation unit 152 by assuming that a phase error component or amplitude error component is present.

First several to ten-odd metrics from the semi-maximum likelihood value of metrics calculated at step S106 are temporarily stored in the storage unit 153 (step S108). Moreover, a phase error component and amplitude error component are estimated by the phase/amplitude error estimation unit 155 to recalculate the metric by the metric calculation unit 152 (step S110). A phase error component and amplitude error component may be estimated by the phase/amplitude error estimation unit 155 optionally in accordance with the modulation method, communication environment and the like.

After a phase error component and amplitude error component being estimated by the phase/amplitude error estimation unit 155, the estimated phase error component and amplitude error component are sent to the metric calculation unit 152. Then, the metric calculation unit 152 recalculates metrics for points corresponding to the predetermined metrics from the semi-maximum likelihood value stored at step S108 by taking the phase error component and amplitude error component into consideration (step S112). A metric recalculation at step S112 is carried out, for example, according to the above Formula (2).

When the metric recalculation by the metric calculation unit 152 in consideration of the phase error component and amplitude error component is completed, in the maximum likelihood pattern determination unit 154, the maximum likelihood pattern is determined from metrics determined by recalculation (step S114). The determination of the maximum likelihood pattern is made by the maximum likelihood pattern determination unit 154 using the above Formula (3).

After the maximum likelihood pattern being determined by the maximum likelihood pattern determination unit 154, the soft bit calculation unit 156 uses the determined maximum likelihood pattern to calculate soft bits (step S116). That is, the soft bit calculation unit 156 generates the likelihood at a bit level or symbol level in consideration of the maximum likelihood value and error component for decoding.

The steps S110 to S114 described above may be repeated a plurality of times to determine the maximum likelihood pattern or to estimate a phase error component/amplitude error component. By repeating the steps S110 to S114 the plurality of times, accuracy can be improved.

In the foregoing, the operation of the MLD decoder 150 used in a communication apparatus according to an embodiment of the present invention has been described using FIG. 4.

According to an embodiment of the present invention, as described above, a phase error component and amplitude error component are estimated by the phase/amplitude error estimation unit 155, metrics are recalculated by the maximum likelihood pattern determination unit 154 by taking the estimated phase error component and amplitude error component into consideration, and a maximum likelihood point is searched for by the maximum likelihood pattern determination unit 154. As a result, characteristic degradation when a signal modulated by a modulation method like 64 QAM MIMO-MLD by which a phase error component or amplitude error component contained in a received signal greatly affects demodulation is decoded can be minimized even in an environment in which nonlinear noise or distortion due to an RF error is present.

The operation of the MLD decoder 150 described above may be performed by a computer program being stored inside the receiving apparatus 110 (for example, a ROM or EEPROM) and the computer program being sequentially read by a CPU (Central Processing Unit) for execution.

(Modification)

Subsequently, a modification of the embodiment of the present invention described above will be described. Here, the concept of the embodiment of the present invention described above is applied to an operation amount reduced MLD receiving method such as a sphere decoder and a list sphere decoder using QR decomposition.

In a sphere decoder (See, for example, E. Viterbo and J. Boutros, "A universal lattice code decoder for fading channels," IEEE Trans. Inform. Theory, vol. 45, pp. 1639-1642, July 1999 or the like), for example, when a pattern whose metric value stays within a radius $\lambda$ is extracted, an optimum pattern may be searched for by including, like Formula (4) shown below, a phase error component and amplitude error component ($\alpha_i$).

$$(\|Y \cdot \alpha_i - H \cdot S_k\|^2 - \delta^2 I) \leq \lambda^2 \quad \text{[Formula 4]}$$

By applying the concept of the embodiment of the present invention described above to the operation amount reduced MLD receiving method, an optimum pattern taking a phase error component and amplitude error component into consideration can be searched for while the operation amount in the MLD being reduced. As a result, characteristic degradation when a signal modulated by a modulation method like 64 QAM MIMO-MLD by which a phase error component or amplitude error component contained in a received signal greatly affects demodulation is decoded can be minimized even in an environment in which nonlinear noise or distortion due to an RF error is present.

The present application contains subject matter related to that disclosed in Japanese Priority Patent Application JP 2008-153240 filed in the Japan Patent Office on Jun. 11, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

In the above embodiment, for example, a metric is calculated to determine a maximum likelihood signal pattern by assuming that a phase error component or amplitude error component is contained in a received vector, but the present invention is not limited to such an example. For example, a metric may be calculated to determine a maximum likelihood signal pattern by considering that a phase error component or amplitude error component is contained not only in a received vector, but also in channel information.

What is claimed is:

1. A communication apparatus, comprising:
   a transmission pattern generation unit that generates a transmission pattern according to a modulation method;
   a metric calculation unit that calculates an inter-signal distance between a received signal vector of signals received by a plurality of antennas and an estimation vector, which is a product of channel information and the transmission pattern;
   a maximum likelihood pattern determination unit that determines a maximum likelihood signal pattern from the inter-signal distance calculated by the metric calculation unit; and
   an error estimation unit that estimates a phase error component and an amplitude error component contained in the received signal vector, wherein
   the metric calculation unit calculates the inter-signal distance between the received signal vector and the estimation vector by using the phase error component and/or the amplitude error component estimated by the error estimation unit;
   the metric calculation unit determines an upper limit, a lower limit, and a step size of the phase error component and the amplitude error component in accordance with resistance of the modulation method to calculate the inter-signal distance between the received signal vector and the estimation vector; and
   the metric calculation unit applies an optimum solution search algorithm to reduce a number of searches for calculating the inter-signal distance.

2. The communication apparatus according to claim 1, wherein the error estimation unit estimates only the phase error component when the modulation method is phase modulation.

3. The communication apparatus according to claim 1, wherein the error estimation unit estimates only the amplitude error component when the modulation method is amplitude modulation.

4. The communication apparatus according to claim 1, wherein the error estimation unit estimates the phase error component and the amplitude error component for each channel or sub-channel.

5. The communication apparatus according to claim 1, wherein the error estimation unit estimates the phase error component and the amplitude error component by weighting or averaging a plurality of channels or sub-channels.

6. The communication apparatus according to claim 1, wherein the metric calculation unit makes a search without considering a phase error and an amplitude error and calculates the inter-signal distance by considering the phase error and the amplitude error only for a group of the estimation vectors corresponding to transmission signal patterns selected from combinations of semi-maximum likelihood signals whose inter-signal distance is short.

7. The communication apparatus according to claim 1, further comprising a maximum likelihood information generation unit that generates maximum likelihood information in units of bits or symbols using the maximum likelihood pattern determined by the maximum likelihood pattern determination unit and the phase error component and the amplitude error component.

8. The communication apparatus according to claim 1, wherein the maximum likelihood pattern determination unit determines, when determining the maximum likelihood signal pattern using an operation amount reduced MLD algorithm, the maximum likelihood signal pattern by taking the phase error component and the amplitude error component into consideration.

9. The communication apparatus according to claim 1, wherein the maximum likelihood pattern determination unit determines the maximum likelihood signal pattern by considering that the channel information also contains the phase error component and the amplitude error component.

10. A communication method, comprising the steps of:
    generating a transmission pattern according to a modulation method;
    calculating a metric of an inter-signal distance between a received signal vector of signals received by a plurality of antennas and an estimation vector, which is a product of channel information and the transmission pattern;
    determining a maximum likelihood signal pattern from the inter-signal distance calculated by the metric calculation step; and
    estimating a phase error component and an amplitude error component contained in the received signal vector, wherein
    the metric calculation step calculates the inter-signal distance between the received signal vector and the estimation vector by using the phase error component and/or the amplitude error component estimated by the error estimation step;

the metric calculation step determines an upper limit, a lower limit, and a step size of the phase error component and the amplitude error component in accordance with resistance of the modulation method to calculate the inter-signal distance between the received signal vector and the estimation vector; and the metric calculation step applies an optimum solution search algorithm to reduce a number of searches for calculating the inter-signal distance.

11. A non-transitory computer-readable medium storing therein a program causing a computer to perform the steps of:

generating a transmission pattern according to a modulation method;

calculating a metric of an inter-signal distance between a received signal vector of signals received by a plurality of antennas and an estimation vector, which is a product of channel information and the transmission pattern;

determining a maximum likelihood signal pattern from the inter-signal distance calculated by a metric calculation unit; and estimating a phase error component and an amplitude error component contained in the received signal vector, wherein the metric calculation step calculates the inter-signal distance between the received signal vector and the estimation vector by using the phase error component and/or the amplitude error component estimated by the error estimation step;

the metric calculation step determines an upper limit, a lower limit, and a step size of the phase error component and the amplitude error component in accordance with resistance of the modulation method to calculate the inter-signal distance between the received signal vector and the estimation vector; and the metric calculation step applies an optimum solution search algorithm to reduce a number of searches for calculating the inter-signal distance.

* * * * *